Figure 1:
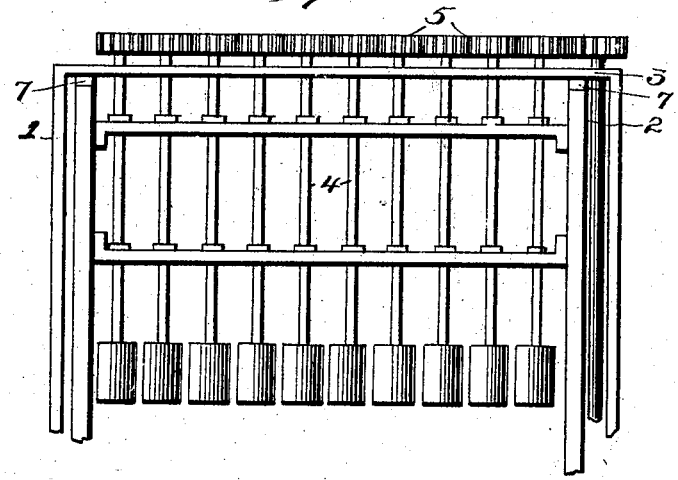

No. 718,210. PATENTED JAN. 13, 1903.
W. W. LAWDER.
MACHINE FOR SOLDERING CAPS ON CANS.
APPLICATION FILED MAY 27, 1902.
NO MODEL.

Witnesses:
J. M. Fowler Jr.
Jos. T. Peake.

Inventor
William W. Lawder
By F. O. McCleary
Atty

UNITED STATES PATENT OFFICE.

WILLIAM W. LAWDER, OF HALETHORPE, MARYLAND.

MACHINE FOR SOLDERING CAPS ON CANS.

SPECIFICATION forming part of Letters Patent No. 718,210, dated January 13, 1903.

Application filed May 27, 1902. Serial No. 109,251. (No model.)

*To all whom it may concern:*

Be it known that I, WILLIAM W. LAWDER, a citizen of the United States, residing at Halethorpe, in the county of Baltimore and State of Maryland, have invented certain new and useful Improvements in Machines for Soldering Caps on Cans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for soldering caps on cans, and particularly to the class of can-capping machines in which a vertically-movable cross-head is employed in connection with a plurality of soldering-tools, each of said tools having an upwardly-extending shank passing through said cross-head. Machines of this type are disclosed in Letters Patent No. 520,523, granted May 29, 1894, and No. 568,849, granted October 6, 1896, to M. J. Hawkins.

The object of the present invention is to provide a machine of the type above indicated with simple and effective means for controlling or gaging the downward movement of the cross-head and soldering-tools, whereby the machine may be readily adapted for capping cans of different sizes without adjusting the operating devices or other parts of the machine.

The invention consists in means for arresting the downward movement of the cross-head and soldering-tools, as hereinafter fully described, and particularly pointed out in the appended claims.

In the drawings I have shown only such parts of the machine as are necessary to an understanding of the improvement.

Figure 2:
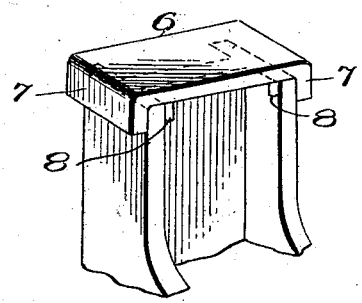
Figure 3:
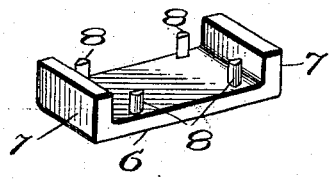

Figure 1 is a front elevation of a portion of a machine for soldering caps on cans with my improvement applied thereto. Fig. 2 is a perspective view of one of the standards with the improvement applied. Fig. 3 is a perspective view showing one of the stop-blocks in inverted position.

The reference-numerals 1 and 2 designate the machine-standards, above which operates the cross-head 3. Extending through the cross-head are the shanks 4 of the soldering-tools, and above the cross-head are the intermeshing gears 5 for effecting the revolution of the soldering-tools.

The vertical movement of the cross-head and tools is effected through the medium of mechanism not shown, and such vertical movement is uniform and unvaried. For this reason the machine is only adapted for use with cans of a predetermined height. To adapt the machine for soldering caps on cans of a greater height than those for which the machine is normally adjusted, I employ at each end of the cross-head a removable stop-block of the construction shown in Fig. 3. The block 6 is provided at each end with a depending lug 7 to overlap the front and rear sides of the standards 1 and 2, and between the lugs are depending parallel pins 8, which serve to support the blocks in position upon the standards.

When it is desired to cap and solder cans of larger size than those for which the machine is normally adjusted, the blocks 6 are placed in the position shown in Figs. 1 and 2, and the downward movement of the cross-head and soldering-tools is thus limited by the thickness of the blocks.

To restore the machine to a condition to operate upon the smaller-sized cans, it is only necessary to remove the stop-blocks, which can be quickly done by hand.

I claim—

1. The combination, with the standards and vertically-movable cross-head of a can-soldering machine, of stop-blocks provided with depending lugs and parallel pins, said blocks being removably supported upon the standards, to arrest the downward movement of the cross-head, substantially as described.

2. In a machine for soldering caps on cans, the combination, with the standards and vertically-movable cross-head, of the stop-blocks provided with depending lugs at their sides to fit the outer sides of the standards, and pins arranged in parallel relation to fit the inner sides of said standards, said stop-blocks being removably supported upon the standards to limit the movement of the cross-head, substantially as described.

In testimony whereof I affix my signature in presence of two witnesses.

WILLIAM W. LAWDER.

Witnesses:
HENRY S. BREWINGTON,
ROBERT C. RHODES.